United States Patent
Baldwin, Jr.

(10) Patent No.: US 6,625,661 B1
(45) Date of Patent: Sep. 23, 2003

(54) INTERACTIVE ENTERTAINMENT SYSTEM

(76) Inventor: Kenneth G. Baldwin, Jr., 10 Hinterland Rd., Rhinebeck, NY (US) 12752

( * ) Notice: Subject to any disclaimer, the term of this patent is extended or adjusted under 35 U.S.C. 154(b) by 0 days.

(21) Appl. No.: 09/336,595

(22) Filed: Jun. 21, 1999

(51) Int. Cl.[7] .............................................. G06F 15/14
(52) U.S. Cl. ...................... 709/250; 709/217; 709/218; 709/227; 709/228; 709/229; 709/246; 463/42; 463/43
(58) Field of Search ................................ 709/250, 217, 709/218, 227, 228, 229, 246; 463/42, 43

(56) References Cited

U.S. PATENT DOCUMENTS

| | | | | |
|---|---|---|---|---|
| 5,315,057 A | * | 5/1994 | Land et al. .................... 84/601 |
| 5,721,827 A | * | 2/1998 | Logan et al. ................ 709/217 |
| 5,795,228 A | * | 8/1998 | Trumbull et al. .............. 463/40 |
| 5,851,149 A | * | 12/1998 | Xidos et al. .................... 463/42 |
| 5,931,906 A | * | 8/1999 | Fidelibus et al. ............ 709/217 |
| 5,973,684 A | * | 10/1999 | Brooks et al. ................ 345/716 |
| 5,974,398 A | * | 10/1999 | Hanson et al. ................. 705/14 |
| 6,113,495 A | * | 9/2000 | Walker et al. ................. 463/42 |
| 6,165,072 A | * | 12/2000 | Davis et al. .................... 463/29 |

* cited by examiner

Primary Examiner—Frantz B. Jean

(57) ABSTRACT

An interactive software system for expanding the interactive dynamics of entertainment software in which local session files from a local computer are transferred through a network to a host computer for interpretation, resulting in modification to and transmission of update files which are then stored on the local computer for integration into the entertainment session. The local computer includes an interaction sequencer which controls the use of local session files. The host computer includes an interaction interpolator, which oversees the ultimate control of the entertainment session and enhances the local session files, which provide the interaction sequencer with data as a guide for the entertainment session.

12 Claims, 12 Drawing Sheets

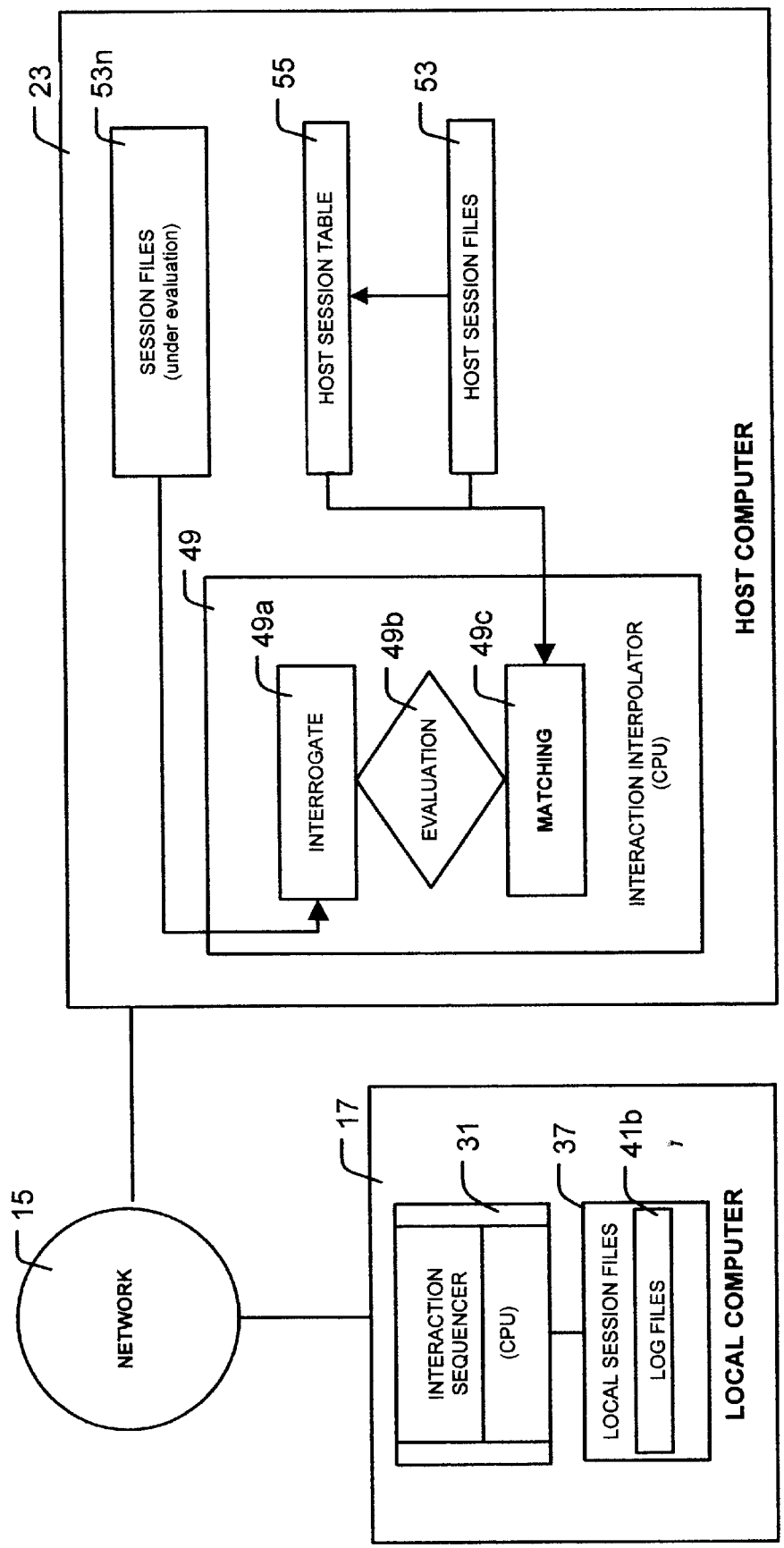

INTERACTIVE ENTERTAINMENT SYSTEM

BACKGROUND OF THE INVENTION

1. Field of the Invention

This invention relates to entertainment systems and more particularly to entertainment systems operated on a local computer and a host computer where the host computer enhances the operation of the local computer.

2. Prior Art and Objects

Computer games are well known with a vast supply of games being available to the public. Some of the available games are more difficult than others and pertain to various themes and characters to entice the desires of a wide variety of players. None of the available games, however permits an evaluation of the player's attributes and desires to permit alternatives of the game to meet the abilities and desires of the game.

The instant invention provides not only a selection of characters and types of game, but evaluates through use of a computer connected to a local computer the skill and frustration of the player and as a result, to modify and enhance the game to meet and satisfy the needs and desires of the player.

Therefore, it is an object of this invention to provide and interactive entertainment system by which the game played on a local computer is enhanced by the host computer connected to the local computer by a network.

It is a further object of this invention to provide an interactive entertainment system that provides a personalized game for each player.

It is a further object of this invention to provide an interactive entertainment system that provides continuing enhancements to provide continuing interest.

It is another object of this invention to provide a dynamic tracking of the players desires and needs as feedback on their response and satisfaction with the elements and design used in developing the interactive entertainment.

Other objects and advantages of the present invention will become apparent to those of ordinary skill in the art as the description proceeds.

SUMMARY OF THE INVENTION

An interactive entertainment system including a local computer and a host computer. The local computer includes local data storage, which further includes log files, program files, attribute files and component files. The host computer also includes host data storage, which further includes log files, program files, attribute files and component files.

Entertainment software is supplied to the local computer. An interactive sequencer in the local computer controls the session files and changes the output of the session files.

A network interconnects the host computer and the local computer.

An interactive interpolator in the host computer alters the local system files by using the host session files for the purpose of evaluation.

PREFERRED EMBODIMENT

Figure 1:
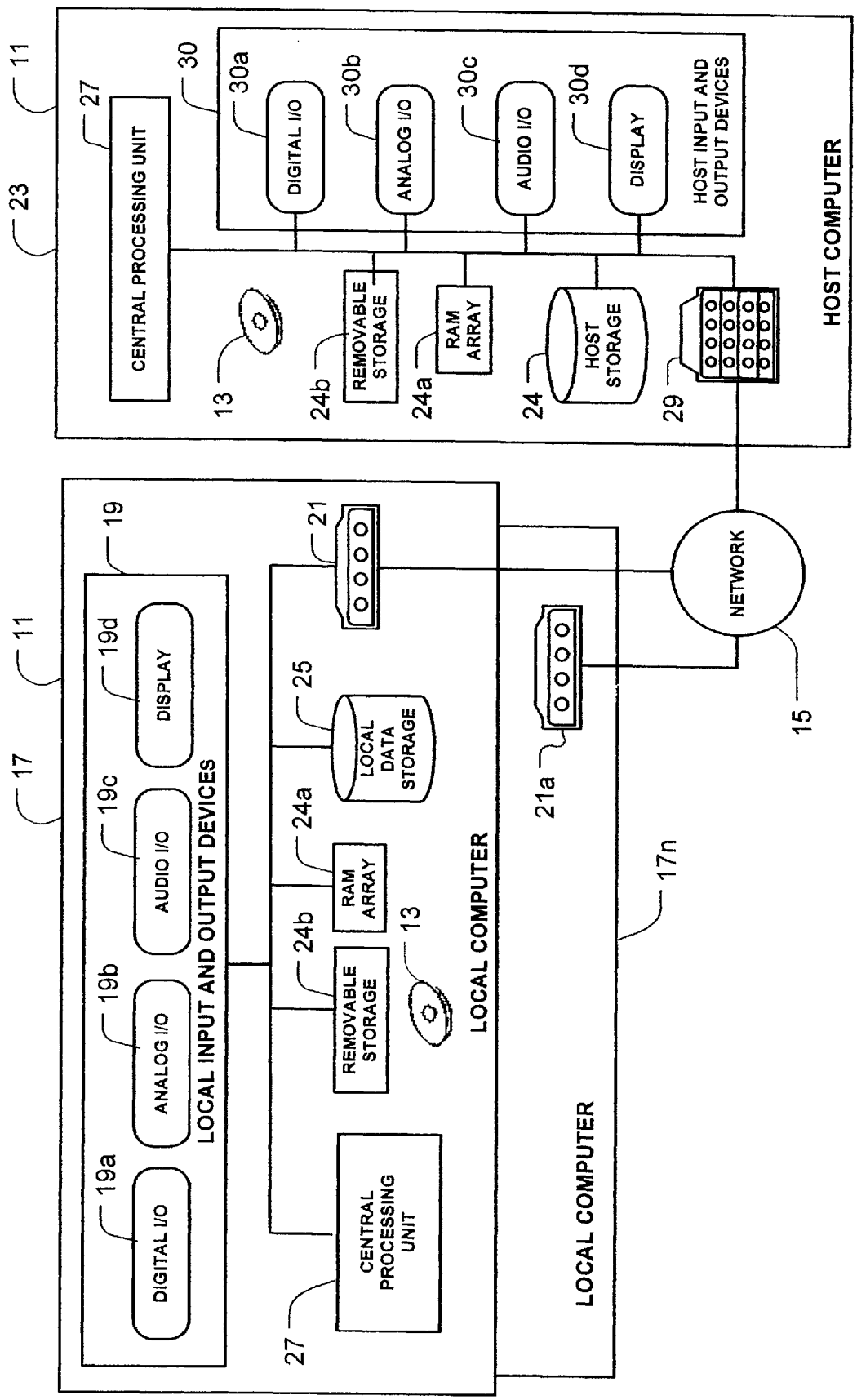
FIG. 1. shows the hardware configuration of the local computer and the host computer.

Referring to FIG. 1, two computers 11 exchange data from entertainment software 13 through a communications network 15. A local computer 17 is equipped with variety of local input and output devices 19 (FIG. 2), which allow the player to experience virtual reality and interact with the entertainment software 13. A local communication interface 21 is utilized to connect through the network 15 to a host computer 23. The host computer 23 also includes a host data base 24 as well as RAM array 24a as well as a removable high speed data storage device 24b. Local data storage 25 and central processing unit 27 of the local computer 17 must be compatible with the entertainment software 13 and the related local devices 19 for the input and output of data. Within the local devices 19 for input and output are a digital input output device 19a, an analog input output device 19b, an audio input output device 19c and a display device 19d.

The host computer 23 has a communications interface 29 connection that allows the host computer 23 to process data being simultaneously transferred from a multiplicity of local computers 17n. The host computer 23 also includes host devices 30 for the input and output of data primarily during programming. Programming could also be supported from a workstation (not shown) remote to the host computer 23. Completed programs are loaded onto the host computer 23 via the network 15 or any other means of file transfer. The host database 24 is a storage and relational database. Once the files are stored in the host computer 23 the host devices 30 will only be required for testing and service.

The host devices 30 for input and output include a display device 30d, an analog input output device 30b, an audio input output device 30c, and a digital input output device 30a.

Throughout the various Figures, details are shown and labeled which are part of standard hardware and thus are not described herein or are numbered. Components of the local computer 17 and the host computer 23 may be designated by the same numeral as being the same computer component although in different computers 11.

Figure 2:
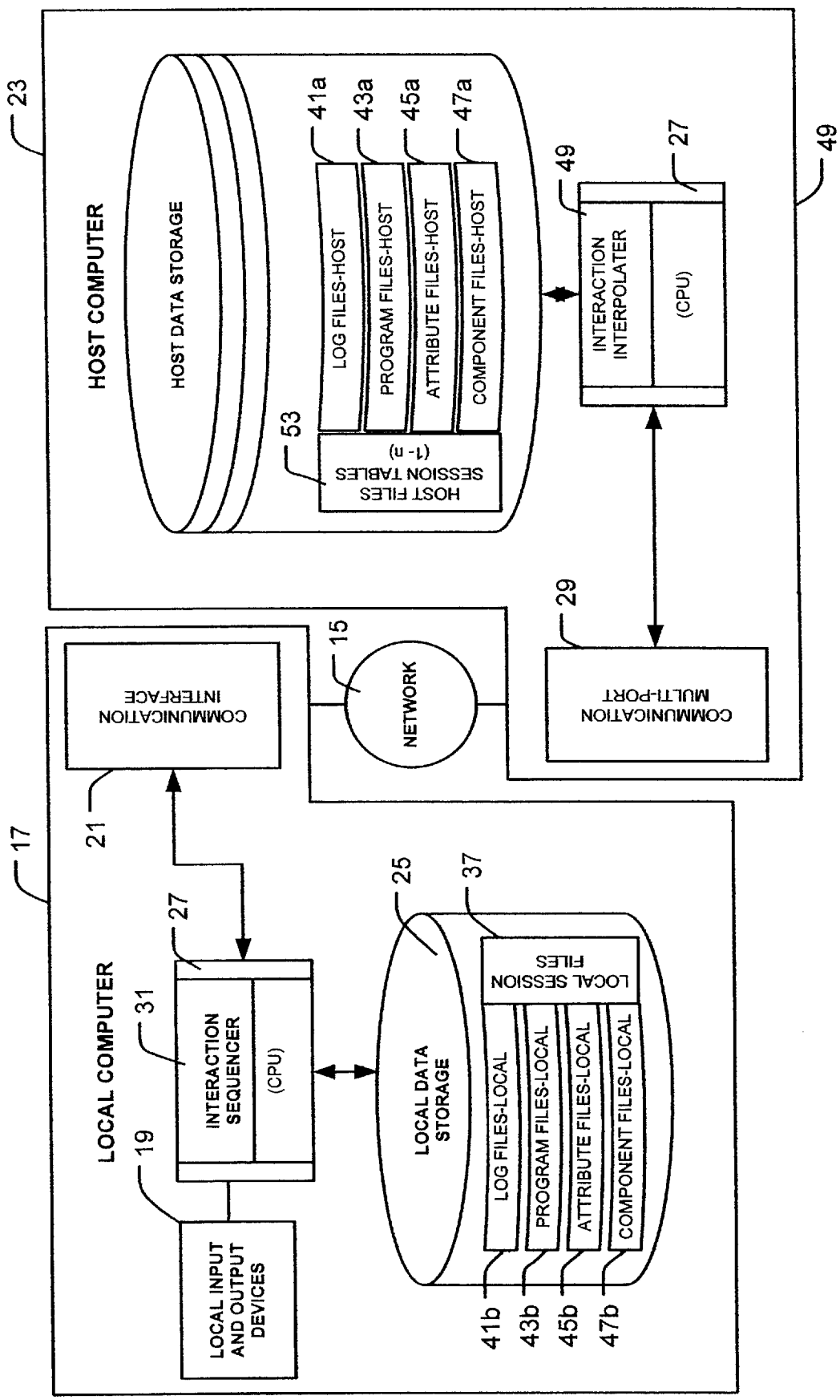
FIG. 2. is a session data update flow chart.

Referring to FIG. 2, as the entertainment software 13 is executed, an interaction sequencer 31 processes a series of steps based on local data storage 25, controlled by the player through local input devices 19, and the updates received from the host computer 23 through the network 15 and the local communication interface 21. The interaction sequencer 31 executing in a central processing unit 27 of the local computer 17 activates the entertainment session.

Figure 3:
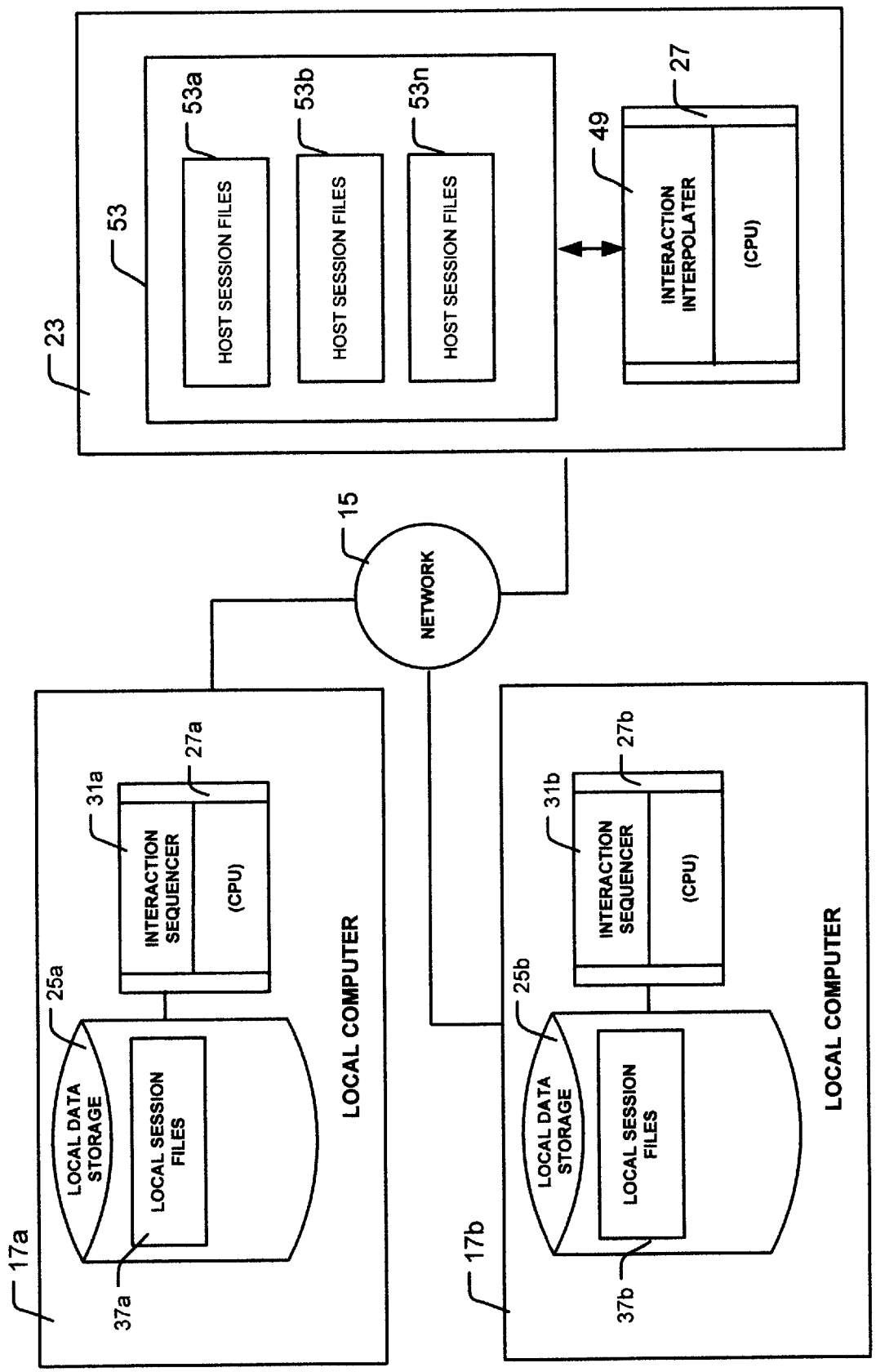
FIG. 3. is a chart of the host to local computer data flow.

Referring to FIG. 3, each local computer 17 stores local session files 37 related to a specific session and having identification in the local data storage 25. It is possible to store more than one set of local session files 37 on the same local computer 17. However the local computer 17 would have to be configured with separately distinguishable devices 19 to support multiple sessions simultaneously.

Local session files 37 are an assembly of several different file formats, including log files 41, program files 43, attribute files 45 and component files 47, depending on the needs of the entertainment software 13.

The log files 41 track the progress of the session, which includes file updates, player responses, player selections, and session events. The log files 41 are initially empty files to be filled as the session progresses.

The program files 43 include the interaction sequencer 31 and sub-routines that support parallel processing of specialized activities including graphic images, motion, audio, voice, robotic control as well as other input and output functions.

The attribute files 45 are similar to log files 41 in that they record player selections. The fact that the attribute files 45 carry initial values as default attributes differentiates them from the log files 41. The attribute files 45 contain information about elements of the entertainment session and of its players characteristics and preferences, as well as the characteristics of the characters and virtual environments. These attribute files 45 are used by the interaction sequencer 31 on the local computer 17 and the interaction interpolator 49 on the host computer 23 for executing decisions related to what files and sequence of files from local data storage 25, will be required to support the entertainment session.

The component files 47 contain supporting data required by the program files 43 in support of the entertainment session including driver files, image files, scene files, and audio files.

The interaction sequencer 31 controls the use of local session files 37 based on responses, communicated through the local input out put devices 19. As the player moves through the entertainment session, input signals from the player are used by the interaction sequencer 31 as the basis to change outputs to the player. The local session files 37 are stored in the local computer 17 data storage 25 to support interaction of the player through continuous play. A set of host session files 53 identical to the local session files 37 are maintained on the host computer 23 allowing each player to initiate their unique session from any local computer 17 connected to the network 15. The first session is designated as 53a and the second as 63b and the last as 53h.

As best described in FIG. 4 the interaction interpolator 49 oversees the ultimate control of the entertainment session and its expansion. The interaction interpolator 49 is executed on the host computer 23 for the interfacing support of the interaction sequencers 31 on a multiplicity of local computers 17. The interaction interpolator 49 includes a comparison to the host session table 55 and then performs an evaluation 49b whether or not to upgrade the session files 37 of the local computer 17. After the session files 37 is determined, as a session begins on the local computer 17, the interaction sequencer 31 initiates a connection with the host computer 23 through the network 15 and sends data files 25, regarding the session status, to the host computer 23. The interaction interpolator 49 includes an interrogator 49a which compares the log files 41 of the local computer 17 with the host session table 55. Then a evaluation device 49b, which is rule based, evaluates the comparison performed by the interrogator 49a and is a matching device 49c.

First a log file 41b from the local computer 17 is interrogated to determine by comparison to a host session table 55 if there has been any prior session activity. The host session table 55 is a logic matrix, which relates the current session position and the attributes to available path options for the player. This session table 55 allows the determination of session files 37 required to support the options available to the player.

Comparing the local session files 37, as recorded in the local data storage 25, the interaction interpolator 49 downloads any files required by the local computer 17.

The interaction interpolator 49 prepares an enhancement of the local session files 37. This enhancement is derived from the host session table 55. The enhancement of the local session files 37 provides the interaction sequencer 31 with data on the use of the enhanced session files 37 and when future connections to the host computer 23 will again be required.

The enhancement of the local session files 37 also provides a path for return back to the local session files 37 provided by default. The local session files 37 by default include requirements for only those files that are resident on the local computer 17 and provide for the continuation of the entertainment sessions in the event the interaction sequencer 31 is unable to establish a connection through the network 15 with the host computer 23.

As the interaction interpolator 49 executes its evaluation of activity, based on a comparison of local session files 37, it presents several options, which are passed through the interaction sequencer 31 to the player. If any session activity has previously taken place by this player from a different local computer 17, since the current local computer 17 was last updated, the player will be given an option to save or delete these additional sessions files 37. If these session files 37, identical to those session files 37 having the same identification as last stored on the host database 24 of the host computer 23, the interaction interpolator 49 will review the local attribute files 45 to see if any activity has updated them since the last connection to the host computer 23.

If the local attribute files 45 have not changed from the data storage 24 of the host computer 23, the interaction interpolator 49 relates this status to the interaction sequencer 31 and the connection to the network 15 is terminated, unless needed for other session activities, or until the interaction sequencers 31 senses the need for updates to the local session files 37.

If changes are found in the local attribute files 45, the interaction interpolator 49 transmits the required updated files based on the local attributes files 45 and the local session files 37. These local session file 37 updates will allow the player to advance through the entertainment session without requiring a connection of the local computer 17 to the host computer 23. Once the local session files 37 are updated, a host session table 55 is modified to reflect the status of the local computer 17. The interaction interpolator 49 signals the interaction sequencer 31 that the updates are complete, and the connection of the network 15 is terminated, unless needed for other session activities or until the interaction sequencer 31 senses the need for updates to the local session files 37.

Figure 4A:
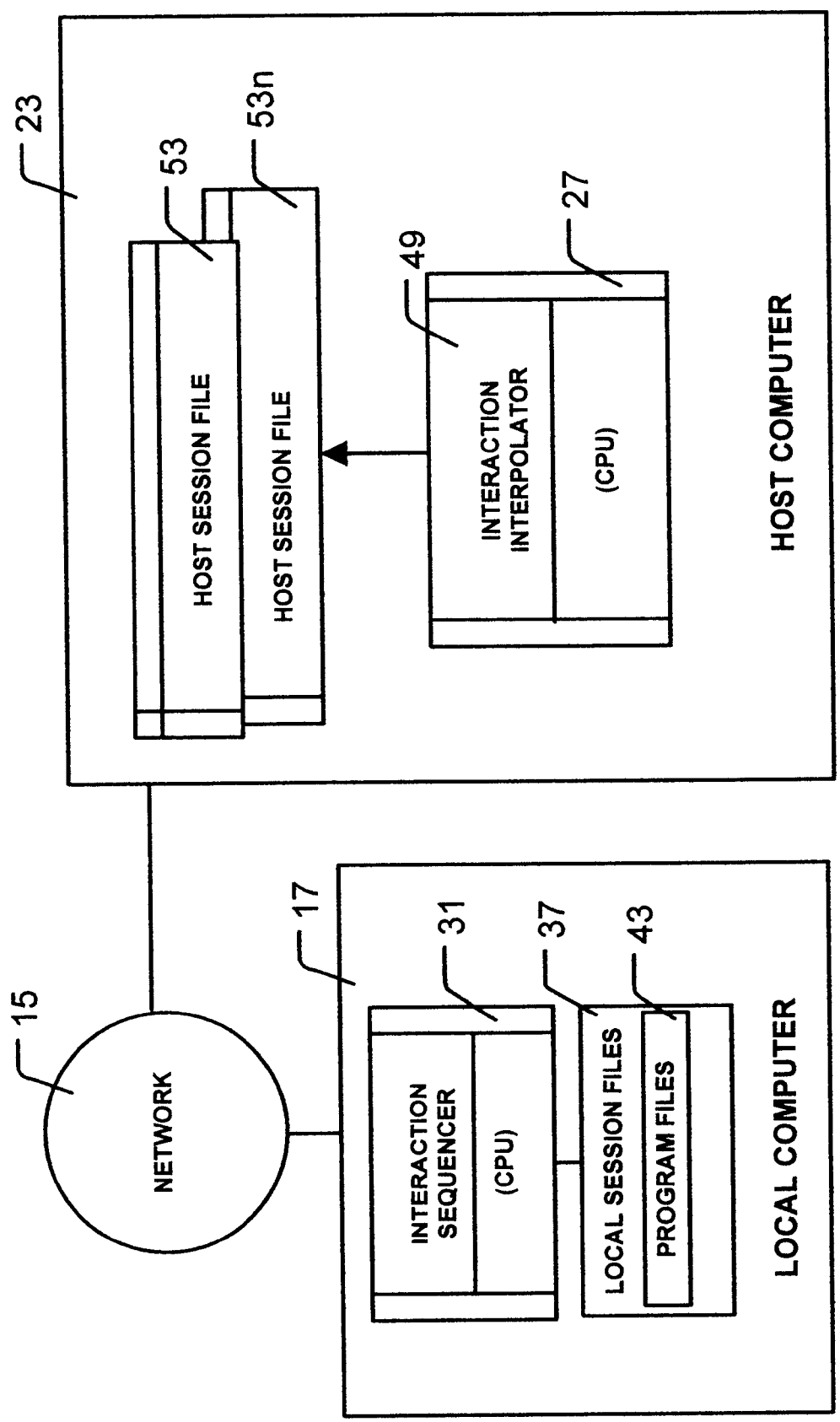
FIG. 4a. is a chart of the session file processing.

In FIG. 4a, the interaction sequencer 31 executes one of the program files 43 which in parallel utilizes information concerning path options, path options, file sequence matrix and communication requirements. These program files 43 are designed to interface with the interaction sequencer 31 to deliver specific and specialized functions. These can range from background control of use of the network 15, which downloads local session files 37, to simulation sequences that appear as integrated segments of a entertainment session, such as travel, fight or race simulations.

Figure 4B:
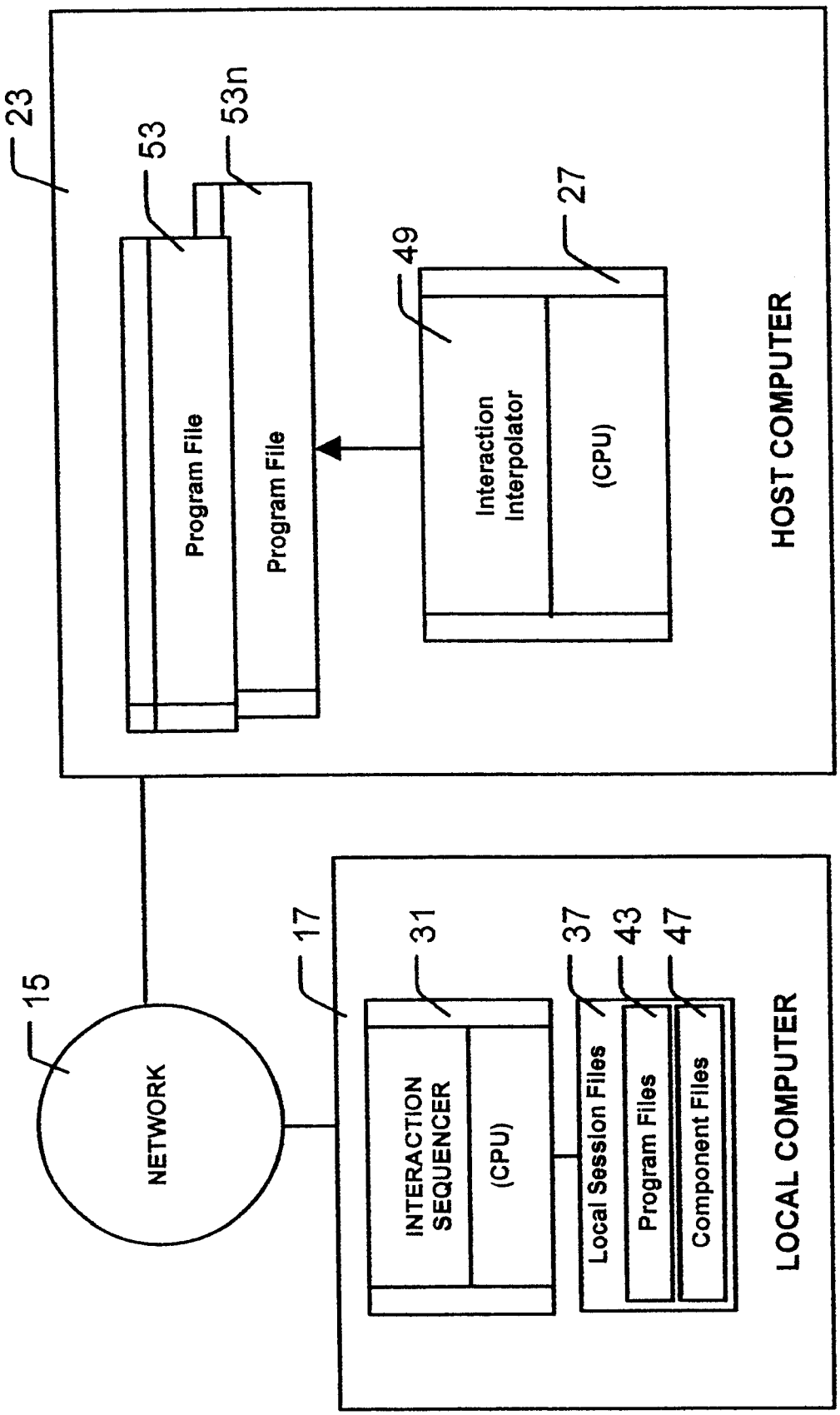
FIG. 4b. is a chart of the interpolator component files.

In FIG. 4b, the component files 47 that are required by the various programs files 43 are downloaded from the host computer 23 into the session files 37 of the local computer 17. As the player moves through the entertainment session, component files 47 are updated by the interaction interpolator 49 in much of the same way as program files 43 are updated.

Figure 4C:
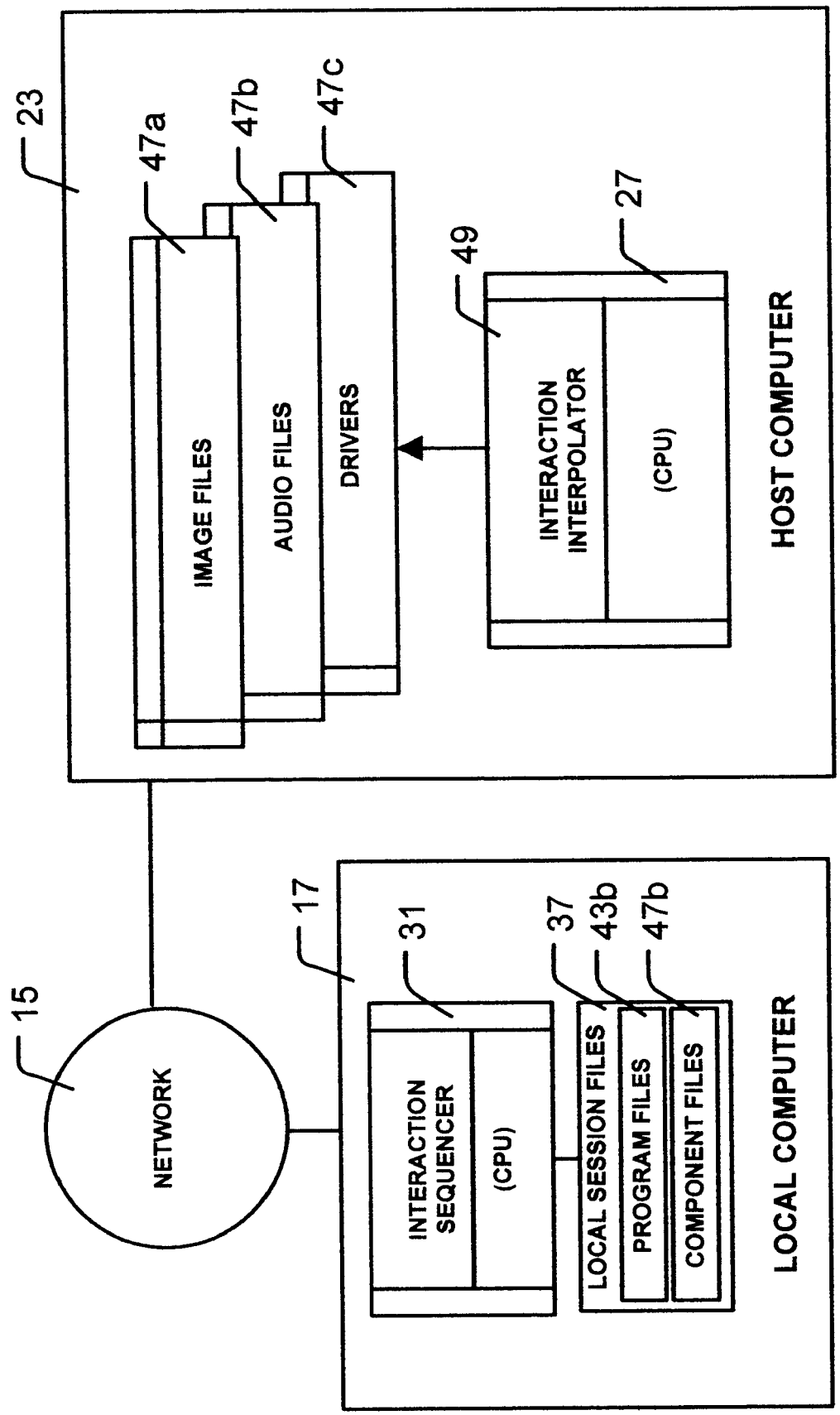
FIG. 4. is a chart of the interpolator process including the host session table.

In FIG. 4c, the host computer 23 and the local computer 17 are shown side by side and connected by a network 15. The host computer 23 includes the Central Processing Unit with the Interaction Interpolator 49. The component files 47 are also located within the host computer 23 with the sub-component files for image 47a, audio 47b and driver 47c.

Figure 5:
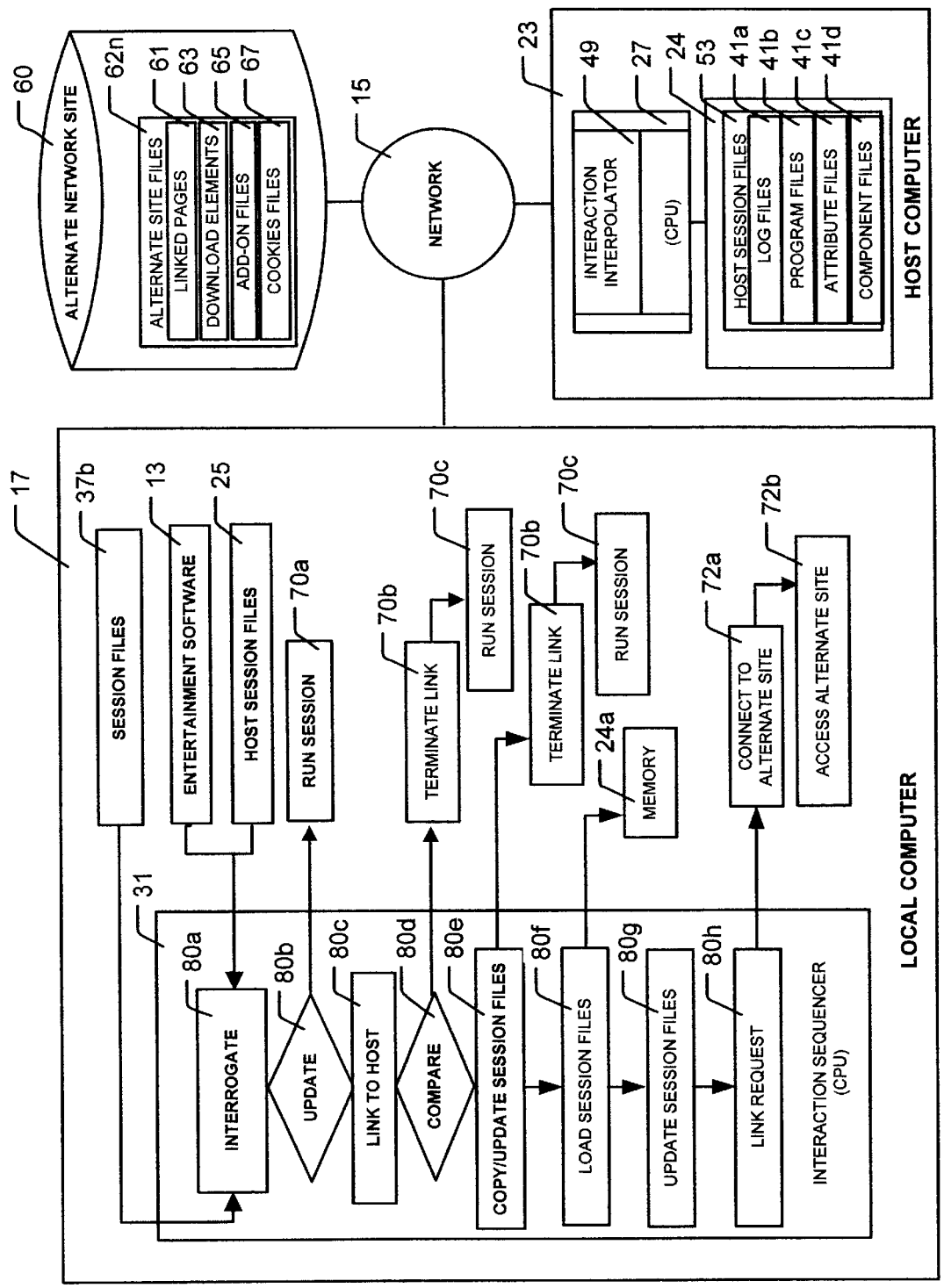
FIG. 5. is a chart of the sequencer session control processing.

As best seen in FIG. 5, the interaction sequencer 31 is the main control program for the entertainment session. Independent of the host computer 23, the interaction sequencer 31 has the ability to function and support entertainment sessions through the completion of the program files 43 utilizing the default files provided with the entertainment software 13. Such operation is not as dynamic as is the entertainment session that includes the host computer 23, and will limit the session dynamics and the experience of the player. Use only of the local computer 17 will allow the player to complete the entertainment session as a linear game with only limited path options.

The interaction sequencer 31 has many functions in the total control of the entertainment session. Several of these are common to other interactive multi-media entertainment products, such as those supporting graphic control and audio control. The interaction sequencer 31 is unique in the way it interlaces the network 15 to expand the experience of the sessions.

Like many entertainment software packages, the interaction sequencer 31 processes data from files in local data storage 25, which creates a virtual world with characters and environments and deliver them to the player complete with sound, and graphic display. Unlike other entertainment software packages, the interaction sequencer 31 is able to connect to a network 15 for supplemental data from the interaction interpolator 49 as required by the activity of the player.

The most basic of these connections expands the entertainment session. As the player interacts with the entertainment software 13, the player is presented with options. These options can range from simple movement such as standing at a point and panning their view of the environment, or opening a door, to complex sequences of responses in solving a puzzle or developing a skill, such as flying a jet fighter. Each response from the player forms a sequence in the entertainment session, which determines what data the interaction sequencer 31 will output as the player continues the entertainment session. In the default files, included with the entertainment software 13, these options are limited to a relatively narrow path of play.

The interaction sequencer 31 connects to the host computer 23 and links with the interaction interpolator 49 to download data from the host session files. The updated data thus archived in the local session file 37 represents the next potential combination of sequences of events within an entertainment session available to the player. Depending on the player's interaction with the interaction sequencer 31, the player will be presented with a variation of the sequence of events as the player continues with the entertainment session. In this way, the player experience can be expanded and tailored to the player's unique interaction with the entertainment session. This provides an enhanced level of virtual reality and a heighten sense of control to the player's personalized experience.

A second feature of the interaction sequencer 31 is its ability to integrate connections to sites on the network 15 into the session. These connections can be limited to specially designed files, sites or pages that expand or enhance the sequence of events, or open to the network 15 for unlimited searches and exploration.

Security will be established with specifically designed files on sites where pages containing security protocol will convey protective identification and pass codes between specially designed sites and the local computer 17. These identifications can be general to the entertainment software 13 or specific to the player. This allows control over versatile interaction between the entertainment software 13 and a multiplicity of network sites.

In addition to the potential site viewing and direct download of files from these network connections, these sites can act as alternate host sites. As alternate host site, this network connection can update local session files 37 with specifically designed data for use by the interaction sequencer 31 in the development of the player's experience. The interaction sequencer 31 will track the network activities and integrate this data into the session files 37. These session files 37 can be used to determine future session events, download of files from the host computer 23 and change the entertainment session.

Figure 5A:
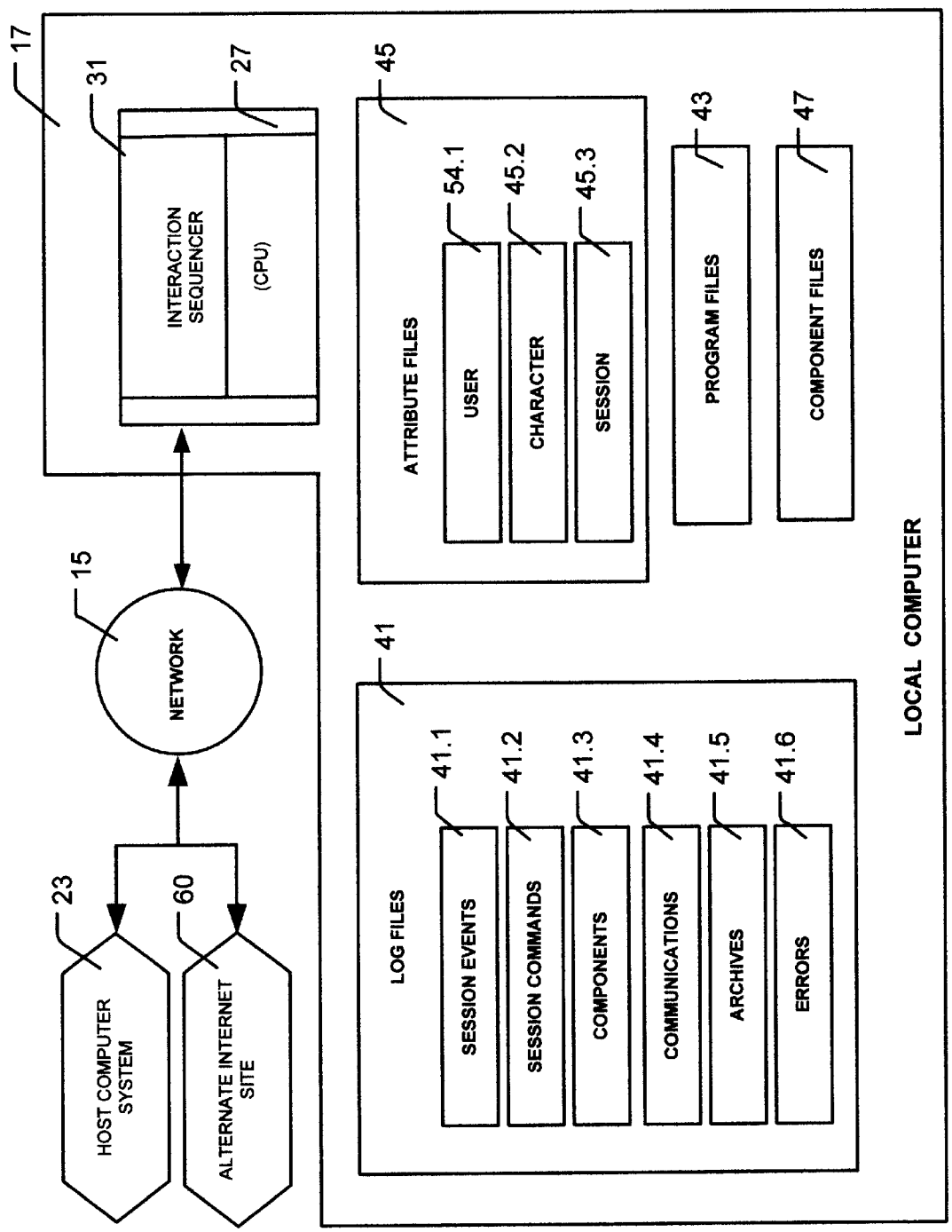
FIG. 5a. is a chart of the sequencer session files.

Referring to FIG. 5a, the interaction sequencer 31 continuously performs analysis of the player input related to the session files 37. This analysis can be structured from any number of logic control options, including rule-based, Boolean, and fussy logic. The logic structure could consist of any combination of general decision strings, special algorithms design specifically for a single entertainment package, or dynamically compiled logic resulting from the player's session activity. These logic structures can be complied into a program files 43. Alternatively, specialized component files 47 can carry this logic to the interaction sequencer 31.

The analysis performed by the interaction sequencer 31 uses various sets of logical structure to select, run and update session files 37. Each session file 37 performs a specific function in supporting the interaction sequencer 31 and it's interaction with the player.

Log files 41 perform the record keeping function of the entertainment session. These log files 41 allow session activities to be used by the program associated with the entertainment session in the control of the player's events. Reports can be generated to track or study the player's activity. The function of these reports can include support of product development, and analysis of product use. This feature provides direct quantifiable feedback from player's interaction with the entertainment software 13.

Log files 41 organize the events of the session files 37 into logical categories that convey status to the local computer 17 and back to the host computer 23 providing an efficient structure for rapid procession of the data. These files can be used to reconstruct the session files 37 for the purpose of achieving and backing up the entertainment session.

Local attribute files 45 are used by the interaction sequencer 31 to store information specific to the characteristics of the player's session, including character features, elements obtained during the entertainment session, and choices made by the player in the configuration of the entertainment session. The information contained in the local attribute files 45 is referenced by the interaction sequencer 31 during the processing of the logic structure of the entertainment session. The data from the local attribute files 45 can affect any aspect of the player's experience. Any one file within the local attribute file 45 in the session file 37 related to the character's appearance could cause the interaction sequencer 31 to apply a component file 47, such as a graphic image file, related to the character's clothing, creating a change in the display output of the character during the entertainment session. In addition to influencing the selection of previously created session files 37, attribute files 45 can affect the entertainment session output by supporting the determination of variables used as the entertainment session proceeds. These variables used during the entertainment session can control wide and diverse number of changes in the session output.

In their simplest form, attribute files 45 might affect the motion of the action in the scene, such as the speed at which the character moves or the distance an object can be projected. In more complex applications, attribute files 45 can be used, by the interaction sequencer 31 or one of the program files 43, to change the processing of data. This program processing can dynamically change the output, allowing the change of any aspect of output delivery, such as the brightness of a scene. By changing the values applied to program files 45 and attribute files 45, or commands in the program, the attribute files 45 will dynamically alter output.

Figure 6:
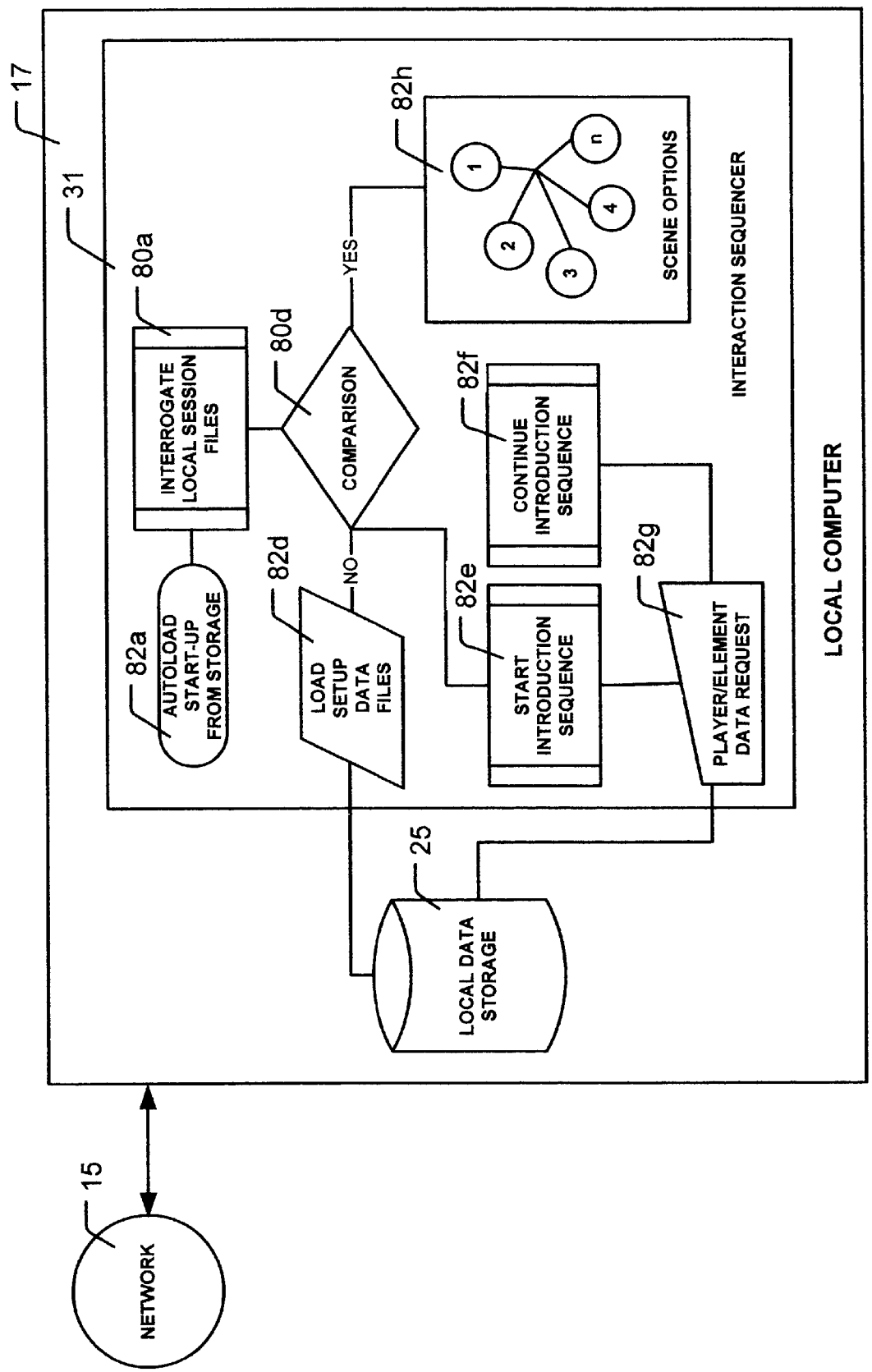
FIG. 6. is a chart of the program start-up.

Referring now to FIG. 6, activities in the local special entertainment software program 13 will vary with the theme or purpose of each entertainment session. There will be several functions that will be relatively generic to all of the entertainment software. One of these common functions is the start-up routine. During the activation of the program start-up, the interaction sequencer 31 is established as that entertainment session's primary control. If the interaction sequencer 31 on the local computer 17 has not yet been updated, data from the local session files 37 is loaded into the interaction sequencer 31.

Once the interaction sequencer 31 is functioning with the local computer 17, several basic procedures must be performed during start-up. The first function executed by the interaction sequencer 31 is to determine what local session files 37 are resident on the local computer 17 and are available for use by the local computer 17.

If the default session files 37 are not available on the local computer 17, but the entertainment software 13 or the network 15 is available the entertainment software files and the interaction interpolator load local session files 37 into the local computer 17.

If a previous session has been executed on the local computer 17, the interaction sequencer 31 will access the log file 41 and attribute files 45 for a status review. After an initial local review, the interaction sequencer 31 would the network 15 to connect with the host computer 23 to allow the interaction interpolator 49 to compare program files 43 related to the last entertainment session's files exchange with the host session files 53, and determine if any changes have been made by the player.

The interaction interpolator 49, on the host computer 23 would perform a comparison of the log files 41 and attribute files 45 from the local computer 17 with the host session files 53 saved on the host computer 23. This review of file status will determine if the host session files 53 have been alternately updated, for instance by a session run from an another local computer 17. If the local session files and the host session files 37 are identical, the interaction sequencer 31 will begin the session from the point where the last session had last been saved.

If the host session files 53 have more recent file dates, compared to the local session files 37, the interaction interpolator 49 would transmit a signal to the interaction sequencer 31. This signal would cause the interaction sequencer 31 to post a message to the player, requesting the player to choose, by way of an input selection whether, local session files 37 or host session files 53, are desired. The local session files 37 or the host session files 53 can be stored under different identifications for resuming the entertainment session in the future.

If the response requests the more recent host session files 53 found on the host computer 23 to be used, the interaction interpolator 49 will load such host session files 53 to begin a new session. If a previous session has been played and the local session files 37 have been found to be different from the host session files 53, the player will be issued a message. This message will be processed by the interaction sequencer 31 to give the player the option to update the entertainment session. If the player requests not to update the entertainment session, the interaction sequencer 31 would send a message to the interaction interpolator 49 requesting the interaction interpolator 49 to download the previous host session files 53.

If no previous local session files 37 where found, but host session files 53 where found, the player would be given the option to load that session or to start a new session. If the player requested to start from the previous session, the interaction sequencer 31 will connect through the network 15 with the interaction interpolator 49 to download the host session files 53 from the host computer 23. The entertainment session will then be started where the previous session left off. If no local session files 37 or no host session files 53 were found, the interaction sequencer 31 will load and execute the local session files 37.

The interaction sequencer 31 will run a subroutine to begin the initial session. The subroutine will vary with the content of the local entertainment software 13, but includes any local session files 37 needed to get the player informed and ready to play. These local session files 37 convey background on the story line, such as safety or training information or provide hints to improve the experience. The interaction sequencer 31 will display a message and a selectable element relating to the players option to exit the entertainment session if desired, which would be a likely choice for second, third or fourth time players.

At the completion of the initial local session files 37 or upon the player's request, the interaction sequencer 31 will proceed to run local session files 37 related to the starting events of the entertainment software 13 on the local computer 17.

FIG. 5 shows the Interaction Sequencer 31 executed within the local computer 17 connected through the network 15 to an alternate network site 60 and the host computer 23. Before this link is established, the interaction sequencer performs an interrogation 80a on the session files 37 and compares them to the files on the entertainment software 13 to evaluate any differences requiring update 80b. If there are no variations in the content of the session files 37 and the files provided in the original entertainment software 13, or if the local data storage 25 contains no session files 37, the interaction sequencer 31 activates the run session command 70a and loads the initial session files 37b. If the local session files 37b have been updated from the initial entertainment software 13 the interaction sequencer establishes a link 80c through the network 15 from the local computer 17 to the host computer 23 where the host computer performs a query of the host session files 53 to determine if copies of the session file 37b from this local computer 17 exist in the host storage 24. If these session files 53 are found in the host storage 24 and they are identical to the session files 37*b* from the player's local computer 17 the connection is terminated 70*b* and the player begins interaction with session 70*c* on the local computer 17. If these session files 53 are found in the host storage 24 and they are different from the session files 37*b* from the player's local computer 17 all session files found to be different are copied 80*e* from the local computer 17 into the host storage 24, replacing the previous session files 53 related to this local computer 17. After file transfer through the network 15 is complete, the interaction interpolator 49 performs it's compare and update process as described in FIG. 4. Once the interaction interpolator 49 completes it's process the network 15 connection between the host computer 23 and the local computer 17 is terminated 70*b* and the player begins interaction with session 70*c* on the local computer 17.

As the interaction session begins on the local computer, the interaction sequencer 31 performs a load operation 80*f* on the session files 37*b* into local memory 24*a*. During play the player interacts with the entertainment session causing changes to the session files 37*b*. The interaction sequencer 31 performs regular updates to the session files 37*b* as required by performing an update operation 80*g* on the session files 37*b*. As a result, the content of the program files 43, changes as attributes are updated in the attribute files 45 and activities of the session are recorded in the log files 41. The player's actions may invoke a link request 80*h* which causes the interaction sequencer 31 to establish a connection through the network 15 to an alternative network site 60.

The alternate network site 60 provides extensions to the interactive entertainment session on the local computer by allowing link request 80*h* to connect to alternate sites 72*a* to expand the play and allow access to alternate site 72*b*, where independent development of entertainment content is added by associated third party developers and sponsors to the entertainment session. The alternative network site 60 contains alternative site files 62*n*. The alternative site files contain various files including link pages 61, download elements 63, add-on files 65, and cookie 67 as well as other web content files and programs. The alternative network site can be a general access web site or a special limited access web site, where security component are contained within the alternate site file to ensure only authorized access is established. In FIG. 5*a* Log file 41 are updated by the interaction sequencer 31 in the local computer 17 which are shared over a connection through the network 15 to the host computer 55 and to alternative network site 60. As the player interacts with the entertainment session log files 41 including session events 41.1 and commands 41.2, components 41.3 communication activities 41.4 archives 41.5 of intermediate events and error messages 41.6, are updated as a record of all session activities, including attribute file changes of use 54.1, character 45.2, session attributes 45.3, program files 43 and component files 47.

FIG. 6 shows the process of program start-up within the interaction sequencer 31 running on the local computer 17. This process involves the local session files 37 from the local data storage 25. The process begins with autoload startup 82*a* from local storage 25 where the interaction sequencer 31 performs an interrogation 80*a* on the session files 37 The interactive sequencer 31 calls the start-up program from the session files 37 and performs a comparison 82*d* on session files 37 with the host session files 53, as described in FIG. 5. If there are no host session files 53 related to this local computer 17 found on the host computer 55 the interaction sequencer loads the setup program 82*d* and the setup data files and begins the introduction sequence 81*e*, which leads the player into the first interactive session. If the interactive sequencer finds session files 37 it checks the log files to determine which scene forms the scene options 82*h*, the player was last interacting with along with the other necessary session file to continue the session under the conditions under which the player suspended the last session. If the session was played without connection to the host computer 55 and the session files 37*b* related to the interaction are nearing the end of play, the session files 37 will need to be updated.

Figure 7:
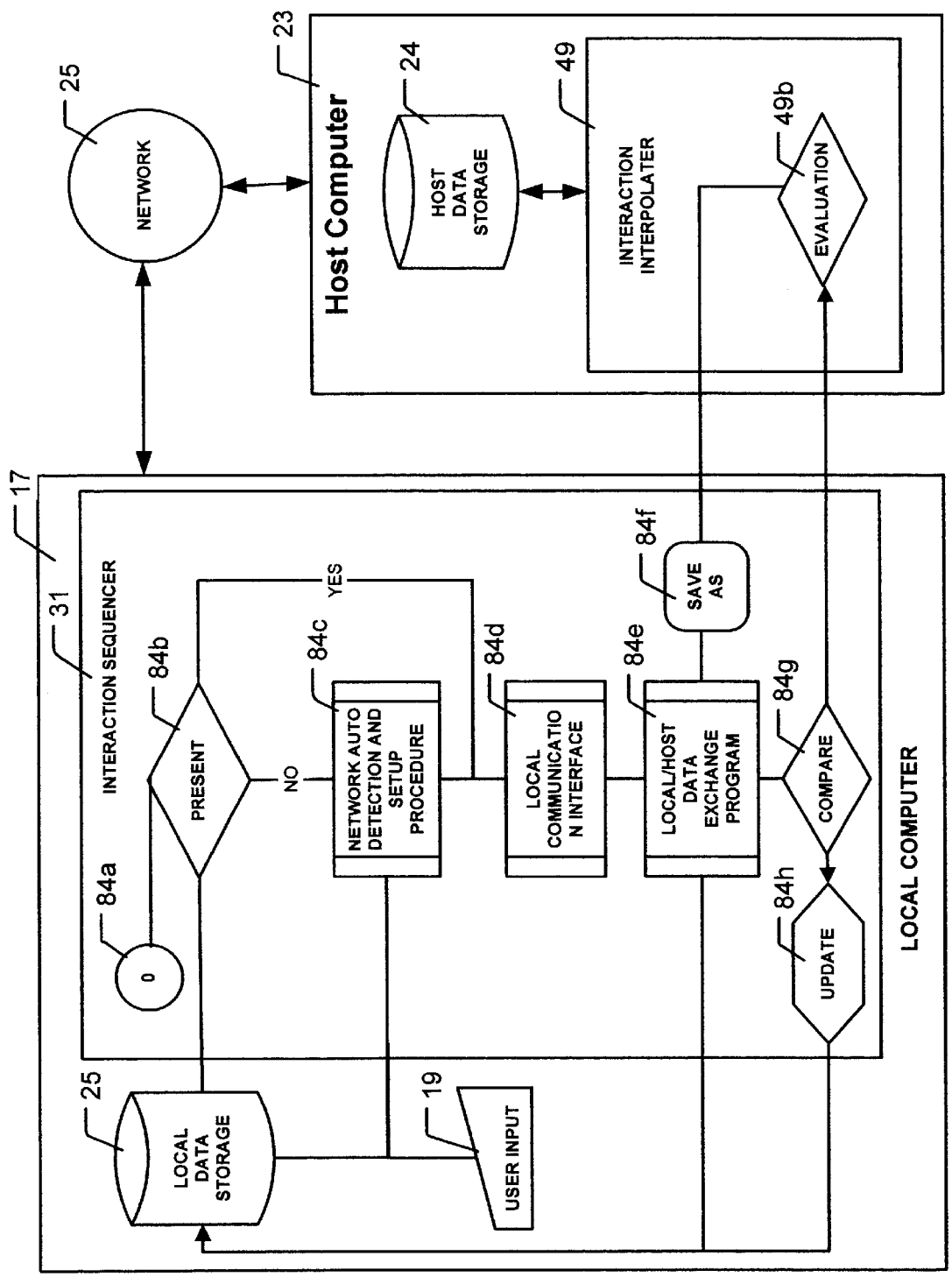
FIG. 7. is a chart of the network communication interface.

FIG. 7 shows the initial communication interface being establish between the local computer 17 and the host computer 23 through the network 15. This process involves the interaction sequencer validating the presence of interface data 84*b*. If interface data is not present, the program file to initiate the interface connection 84*c* is loaded and the player is guided thought a setup process to define the attributed required to establishes a communication interface 84*d* to the network 15 to communicate between the local computer 17 and the host computer 23. Once the connection is established, the local/host data exchange program 84*e* is invoked to verify and save obsolete files that need to be replaced through a save-as function 84*f* of updated session files 37. Following the update process 80*b*, the interactive sequencer 31 performs a comparison 80*d* compares the existing session files 37 on the local computer 17 with those received through the communication interface. If the file received through the communication interface is more resent than the respective existing session file 37, the interaction sequencer replaced the older file with the more recent session files 37*b* on the local storage 25. If no communication interface can be established, the interaction sequencer reverts back to the original session files 37*x* of the entertainment software 13 found in the local storage 25, as the default session files 37*b* on the local computer 17.

Referring to FIG. 7, a specialized communication program in the entertainment software 13 on the local computer, under the control of the interaction sequencer 31, establishes and oversees communication through the network 15 to a host computer 23. This procedure starts with the verification of modem availability. The program checks the local computer 17 for the presence of a modem. If the local computer 17 does not have a modem, or the modem is not configured, a message will be displayed to describe options available to the player. These options include running the entertainment software 13 without a network 15 or connecting to a network 15. If a network 15 is to provide the primary network access to the host computer 23, the drivers and port configuration would be established as part of the local computer 17.

Once a connection through the network 15 is established, the local computer 17 connects to the host computer 23 when the interaction sequencer 31 issues the command. As the interaction sequencer 31 performs its functions producing the virtual experience to the player, the communications program of the entertainment software 13 runs in the background. The communications program provides functions including file transfers to and from the interaction interpolator 49 at the host computer 23 and in support of sessions over the network 15.

Figure 8:
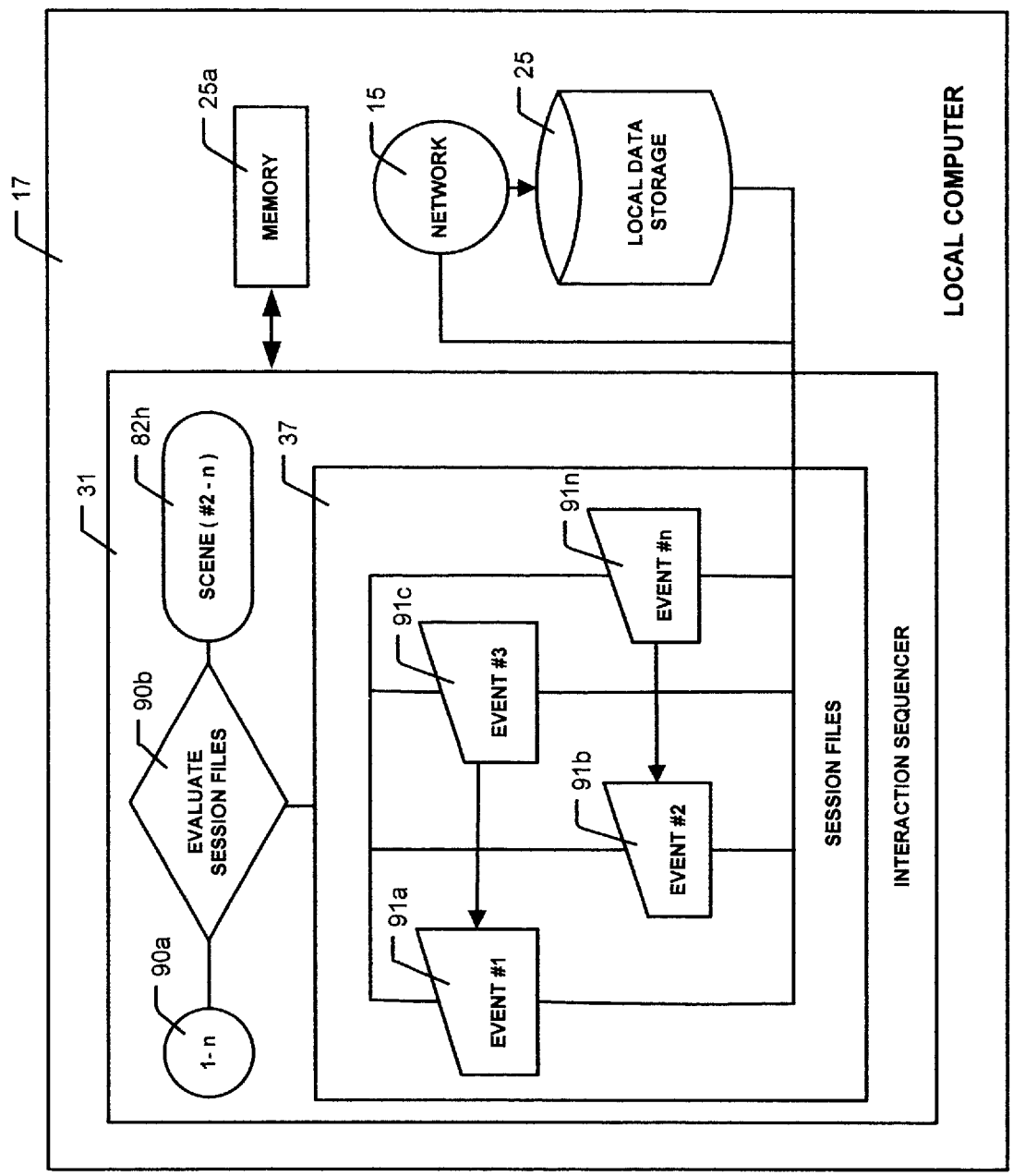
FIG. 8. is a chart of session file sequencing flow.

FIG. 8 is an example of typical session file sequencing for a given scene 90*a* in a typical interactive session. As the player interacts with the entertainment software through the events 91*a*–91*n* programmed into the session files 37, options are presented for the interaction sequencer 31 to initiate the evaluation process 90*b* which event is to be the next activated event. As an event become active 82*h* the interactive sequencer 37 loads the respective session files 37 into the active memory 25a. These session files in memory include move options and component specification and component files required for to create the session events. If the player does not supply input to the session, a default sequence of events and actions will be used to continue play through the scene's conclusion according to a default attribute file 45 in the local storage 24. Once a scene has been completed by the player or according to the default attribute file, the interactive sequencer 31 initializes the next scene as determined by the sequence program file 43 in the session files 37 on the local computer 17.

Referring to FIG. 8, the interaction sequencer 31 will run the local session files 37 as the guide for activities it in the entertainment session. The local session files 37 will provide the move options available to the player based on their current attribute status and position of play. It also will provide the logic for the selection and use of component files 47 selection and use. The interaction sequencer 31 for the purpose of producing output to the player will process the information from local session files 37.

As the entertainment session advances, the log files 41 are updated in local data storage 25, and the interaction sequencer 31 tracks the players path relationship to the need to reconnect to the host computer 23. If such a reconnection is detected, the local session files 37 are updated via the network 15 with the host computer 23.

This cycle of updates continues through the completion of the entertainment software 13.

One of the first activities of the game would be to give the main character a unique name which will be an identification and an access code which is the password. This name would be registered through the network 15 on the host computer 23. The name would be checked for duplication in the host computer 23 and, if rejected, the player would be instructed to choose another. Once the name and access code are established, all local session files 37 associated with this entertainment session would be identified and accessed by indexing the name. The player would be able to select from a series of character attributes, which in turn would more uniquely describe the characters appearance and personality.

As the player directs the selected character through specially designed scenes, the events and screen selections will be tracked and serve further augment the characters personality and experience. For instance, if the character in the game was faced with a difficult puzzle and the player exercises the option to seek help by selecting a hint button after being overcome by frustration, the data collected during this game event would measure the level achieved in solving the puzzle and the time elapsed before the hint option was selected. The resulting data would indicate a level of aptitude in solving logical puzzles and a relative threshold for frustration. This information would be utilized in selecting subsequent game paths. If the user demonstrated a high degree of frustration with puzzles and a low aptitude in logical problem solving, future games sequences might avoid puzzles, enhancing the users level of enjoyment.

During the entertainment sessions the local system files 37 would connect through the network 15 with the host computer 23. Specific data about the player's progress on the game would be sent to the host computer 23 by attribute files 45 and log files 41. The interaction interpolator 49 on the host computer 23, which will choose or make modifications to the local session files 37 comprising the game data, would interpret the attribute-files 45. The host session files 53 would be transferred through the network 15 to the local session files 37. As the game reaches an event related to the session files 37, as updated these session files 37 would be substituted for the local session files 37 originally available or the default files supplied with the entertainment software 13. The effects can range from a change in a scene's visual appearance or variations to the audio tracks of a scene, to a complete change in the player's options or events.

In addition, such a game continues to build on basic aspects which can take the player back to a previous scene that has been altered based on the character's activities, or may take the player on an excursion through the network 15. These ventures into cyberspace can be structured to control the player options by controlling the player's events in a specifically designed Alternate Network Site 60, or left open ended allowing the player to explore the network on their own. The result of these excursions would be integrated into the game as a task related to attaining access to the next release of the game.

Thus, while a preferred embodiment of the invention has been shown and described, it will be apparent to those skilled in the art that many other changes and modifications may be made without departing from the invention in its broader aspects. The appended claims are therefore intended to cover all such changes and modifications as fall within the true spirit and scope of the invention.

I claim:

1. An interactive entertainment system for use by a player in an entertainment session, the player having specific characteristics and preferences, the interactive entertainment system, comprising:

a local computer system including local data storage, the local data storage including local session files, the local session files including log files, program files, attribute files and component files; the attribute files containing information about the entertainment session and the player's characteristics and preferences and also having initial default values;

entertainment software for use in the local computer;

an interaction sequencer in the local computer for receiving input signals and for transmitting output signals to change the output of the session files, the local session files being stored in the local computer and the local session files also being stored in the host computer;

a host computer system including host data storage, the host data storage including host session files, the host session files including a host session table, log files, program files, attribute files and component files;

a network interconnecting the host computer and the local computer; and an interaction interpolator in the host computer to alter the local session files, the interaction interpolator using the host session files for the purpose of evaluation of the specific characteristics and preferences of the player, the interaction interpolator performing a comparison between the local files of the local computer and the host session table and evaluating that comparison.

2. An interaction entertainment system according to claim 1 wherein the host sessions files include a password, the password being supplied to the host session files by the local session files.

3. An interaction entertainment system according to claim 1 wherein the host session table is in the form of a local matrix.

4. An interactive entertainment system according to claim 1 wherein the local computer can operate independently of the host computer.

5. An interactive entertainment system according to claim 1 wherein:

the local computer includes a plurality of computers at different locations; and the host computer can transfer the local session files to any computer that is a local computer.

6. An interactive entertainment-system according to claim 1 wherein:

the local computer includes local input devices for transmitting input signals from the player; and the interaction sequencer uses the input signals from the player to change the output signals to the player.

7. An interactive entertainment system according to claim 1 wherein the attribute files are used by the interaction sequencer and the interaction interpolator for executing decisions as to what files and sequences of files will be required from the local data storage.

8. An interactive entertainment system for use by a player in an entertainment session, the player having specific characteristics and preferences, the interactive entertainment system, comprising:

a local computer system including local data storage, the local data storage including local session files, the local session files including log files, program files, attribute files and component files; the attribute files containing information about the entertainment session and the player's characteristics and preferences and also having initial default values, the local computer including local input devices for transmitting input signals from the player;

entertainment software for use in the local computer;

an interaction sequencer in the local computer for receiving input signals and for transmitting output signals, the interaction sequencer uses the inputs signals from the player to change the output signals to the player, the local session files being stored in the local computer and the local session files also being stored in the host computer;

a host computer system including host data storage, the host data storage including host session files, the host session files including a host session table,-log files, program files, attribute files and component files, the local session files being maintained in the host computer;

a network interconnecting the host computer and the local computer; and an interaction interpolator in the host computer, the attribute files being used by the interaction sequencer and the interaction interpolator for executing decisions as to what files and sequences of files will be required from the local data storage, the interaction interpolator performing a comparison between the local files of the local computer and the host session table and evaluating that comparison.

9. An interactive entertainment system according to claim 8 wherein the component files contain supporting data required by the program files in support of the entertainment session including driver files, image files and audio files.

10. An interactive component system according to claim 8 wherein the log files track the progress of the session including file updates, playing responses, player selections and session events.

11. An interactive component system according to claim 8 wherein the program files support parallel processing of specialized activities including graphic images, motion audio, voice, robotic control as well as other input and output functions.

12. An interactive entertainment system for use by a player in an entertainment session, the player having specific characteristics and preferences, the interactive entertainment system, comprising:

a local computer system including local data storage, the local data storage including local session files, the local session files including log files, program files, attribute files and component files; the attribute files containing information about the entertainment session and the player's characteristics and preferences and also having initial default values, the local computer including local input devices for transmitting input signals from the player, the log files tracking the progress of the session including file updates, player responses, player selections and session events, the program files supporting processing of specialized activities including graphic images, motion, audio, voice, robotic control as well as input and output functions, the component files containing support data required by the program files in support of the entertainment session including driver files, image files, scene files and audio files;

entertainment software for use in the local computer;

an interaction sequencer in the local computer for receiving input signals and for transmitting output signals, the interaction sequencer using the inputs signals from the player to change the output signals to the player;

a host computer system including host data storage, the host data storage including host session files, the host session files including log files, program files, attribute files and component files, the local session files being maintained in the host computer;

a network interconnecting the host computer and the local computer; and an interaction interpolator in the host computer, the attribute files being used by the interaction sequencer and the interaction interpolator for executing decisions as to what files and sequences of files will be required from the local data storage.

* * * * *